Patented Sept. 19, 1939

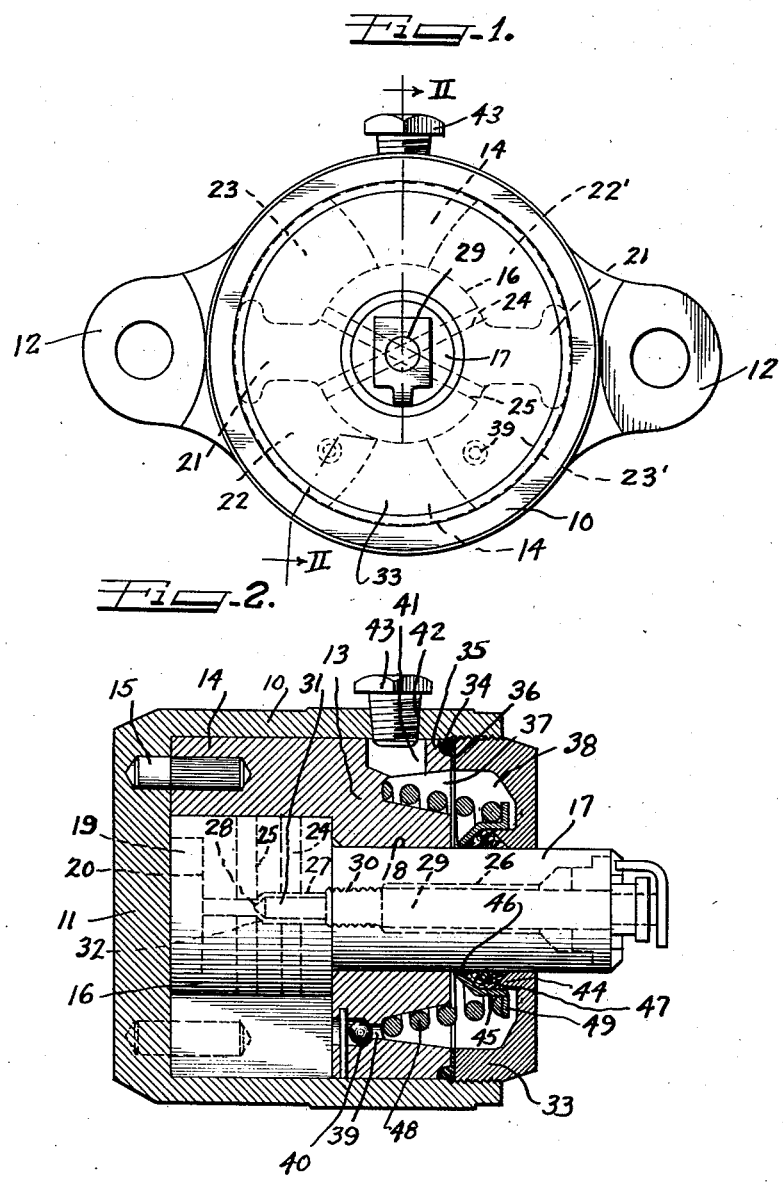

2,173,372

UNITED STATES PATENT OFFICE 2,173,372

HYDRAULIC SHOCK ABSORBER

Ralph F. Peo, Buffalo, N. Y., assignor to Houde Engineering Corporation, Buffalo, N. Y., a corporation of New York Application October 22, 1938, Serial No. 236,425

9 Claims. (Cl. 188—89)

My invention relates to hydraulic shock absorbers particularly of the rotary type in which a vaned piston structure operates in hydraulic working chambers between abutments for displacement of the hydraulic fluid under predetermined resistance to flow, and with the working chambers replenished with hydraulic fluid from a replenishing chamber within the shock absorber structure.

The object of the invention is to provide improved structure and arrangement which will tend to eliminate the leakage of fluid under pressure from the hydraulic working chambers so that the shock absorber efficiency will be maintained at all times. The invention therefore incorporates a number of details of structure and arrangement which will materially simplify and increase the efficiency of the shock absorber structure and which will more effectively eliminate leakage and will return to a replenishing chamber any leakage which might seep through during service of the shock absorber.

The various features of the invention are incorporated in the structure disclosed on the drawing in which:

Figure 1 is an end elevation of the shock absorber; and

Figure 2 is a section on plane II—II of Figure 1.

The shock absorber shown comprises a cup-shaped casing or housing 10 whose base 11 is provided with ears 12 whereby the shock absorber may be secured to a support such as the chassis of an automotive vehicle. Within the casing is the intermediate wall 13 having the diametrically opposed extensions 14 abutting at their inner ends against the base 11. The casing 10 with the walls 11 and 13 define a cylindrical space into which the extensions 14 project radially to form abutments. Pins 15 extend from the base wall 11 into the abutments to thereby hold against rotary displacement the wall 13 and the abutment 14 extending therefrom.

Between the walls 11 and 13 and the abutments 14 is the cylindrical hub 16 of the piston structure whose shaft 17 extends through the passageway 18 in the wall 13 to be journalled by the wall, a bearing lug 19 for the inner end of the hub extending from the base wall 11 into the hub recess 20.

The piston hub has diametrically opposite piston vanes 21 extending therefrom, and the piston hub, with the vanes, and the abutments 14 divide the cylindrical space between the walls 11 and 13 into hydraulic working chambers 22, 22', 23, and 23'. The working chambers 22 and 22' are connected together by a passageway 24 through the piston hub, and the working chambers 23 and 23' are connected together by the passageway 25 through the hub. The piston shaft 17 has the axial bore 26 communicating with the bore 27 in the piston hub, this bore 27 forming a valve chamber which communicates with the passageway 24 and which has communication with the passageway 25 through the valve port 28. Any suitable type of valve structure may be provided. I have shown a simple form of valve comprising a stem 29 extending through the shaft bore and having threaded engagement 30 with the bore and terminating in the needle valve end 31 for cooperation with the conical valve seat 32 surrounding the valve port 28. The valve stem extends beyond the outer end of the shaft bore for ready manipulation for adjustment of the valve and setting of its end relative to the port for determination of the resistance to fluid flow between the working chambers as the piston structure oscillates in the shock absorber body.

An outer wall or cover structure 33 has threaded engagement in the outer end of the casing 10 and abuts the outer face of the intermediate wall 13 so as to force and hold this intermediate wall structure with the ends of the abutment extensions 14 against the inner wall or base 11, the structures 13, 14 having preferably a press fit with the casing wall 10.

In order to maintain efficient shock absorber conditions, leakage of hydraulic fluid out of the working chambers should be eliminated as much as possible, and the wall 13 is therefore made comparatively wide for a long fit in axial direction against the casing wall 10, thus interposing a long high resisting path against leakage from the working chambers. To further resist leakage between the wall structures 13 and 10, sealing material 34 is applied in the annular channel 35 in the outer corner of the wall 13 which is compressed by a sealing washer 36 between the wall 13 and the cover 33 when the cover is screwed into place.

In order that the hydraulic working chambers may be at all times kept filled with hydraulic fluid, a replenishing chamber or reservoir is provided. To form such reservoir space, the wall 13 has the annular recess 37 in its outer side and the cover 33 has the annular recess 38, these recesses together providing reservoir space for hydraulic fluid. Passageways 39 connect the lower end of the recess 37 with the working chambers 22 and 23', these passageways being controlled by check valves 40 which permit flow of fluid from the replenishing chamber into the working chambers but check flow in the opposite direction, so that when the working chambers are under compression the check valves will close the passageways, but when the chambers are under suction fluid will be drawn thereinto to compensate for any loss of fluid from the working chambers. On its upper side the wall 13 has the passageway 41 communicating with the filler opening 42 in the wall 10, a closure plug 43 being provided for the filler opening through which fluid may be charged into the replenishing chamber space.

The cover 33 has an opening for the piston shaft 17 surrounded by the flange 44 which is beveled at its inner end. A packing retainer ring 45 surrounds the shaft 44 and has the inclined inner end 46 between which and the bevelled end of the flange 44 suitable packing material 47 is provided. A spring 48 seats at its inner end against the bottom of the recess 37 in the wall 13, the outer end of the spring abutting the radially extending base flange 49 on the retainer ring 45 so that the ring is pressed outwardly by the spring for compression of the packing material intimately around and against the piston shaft to prevent leakage of fluid from the reservoir to the exterior of the shock absorber.

The retainer ring, after assembly of the shock absorber, terminates a distance short of the outer face of the wall 13, so that any hydraulic fluid which may be forced out of the working chambers and between the shaft and its bearing wall 13 will reach the space between the wall 13 and the retainer ring and flow into the replenishing space. With this arrangement it will be unnecessary to machine intercepting grooves or channels in the shaft bearing wall 13, thus reducing the cost of manufacture of the shock absorbers.

The long intimate fit in axial direction of the wall 13 in the casing wall 10 and the gasket 34 of rubber or other suitable material between the outer end of the wall 13 and the casing wall 10 will assure an efficient seal against leakage from the working chambers outwardly between these walls. The cover 33, besides functioning to securely seat the frame structure 13, 14 and compressing the gasket 34, serves also to provide a portion of the replenishing or reservoir space for hydraulic fluid, and the structure can be very quickly and efficiently assembled.

I have shown a practical embodiment of the various features of the invention but I do not desire to be limited to the exact construction and arrangement shown and described, as changes and modifications may be made without departing from the scope of the invention.

I claim as follows:

1. A hydraulic shock absorber comprising a housing providing a circumferential wall and an inner end wall, an intermediate wall within said circumferential wall, said walls defining a cylinder space, abutments within said cylinder space extending inwardly from said circumferential wall, a vaned piston structure within said cylinder space for displacing hydraulic fluid therein, valve structure controlling the flow of the displaced fluid, said intermediate wall having a long intimate fit in axial direction with said circumferential wall whereby to resist leakage from said cylinder space, an outer or cover wall threading into the end of said circumferential wall for axially securing said intermediate wall, and a sealing gasket between said intermediate wall and said cover wall for further sealing against the escape of fluid from said cylinder space.

2. A hydraulic shock absorber comprising a housing providing a circumferential wall and an inner end wall, an intermediate wall within said circumferential wall, said walls defining a cylinder space, abutments within said cylinder space extending inwardly from said circumferential wall, a vaned piston structure within said cylinder space for displacing hydraulic fluid therein, valve structure controlling the flow of the displaced fluid, said intermediate wall having a long intimate fit in axial direction with said circumferential wall whereby to resist leakage from said cylinder space, an outer or cover wall threading into the end of said circumferential wall for axially securing said intermediate wall, and a sealing gasket between said intermediate wall and said cover wall for further sealing against the escape of fluid from said cylinder space, said intermediate wall and said cover wall having opposed annular recesses providing a chamber for replenishing fluid for said cylinder space.

3. A hydraulic shock absorber comprising a circumferential wall, an end wall enclosing one end of said circumferential wall, an intermediate wall within said circumferential wall, said walls defining a cylinder space, partition walls extending into said cylinder space from said circumferential wall and between said end and intermediate walls, a vaned piston hub in said cylinder space for displacing hydraulic fluid in said space, a closure wall for the other end of said circumferential wall having threaded engagement therein for clamping said end wall and said intermediate wall and said partition walls together axially, a shaft extending from the piston hub and journalled in said intermediate wall and said closure wall, said intermediate wall and said closure wall having opposed recesses providing a replenishing chamber, and valve mechanism extending through said shaft into said piston head for controlling the flow of the displaced fluid.

4. A hydraulic shock absorber comprising a circumferential wall and an end wall closing one end thereof, an intermediate wall within said circumferential wall, said walls defining a hydraulic cylinder space, abutment walls extending inwardly from said circumferential wall between said end and intermediate walls, a piston hub within said cylinder space having vanes operable between said abutment walls for displacing hydraulic fluid, passageways through said piston hub for the displaced fluid and valve mechanism for controlling such flow, a closure wall threading into the other end of said circumferential wall for engagement with said intermediate wall to clamp said intermediate wall and said end wall and abutment walls axially together, a shaft for said piston hub extending through and journalled in said intermediate wall and closure wall, said intermediate wall and said closure wall having opposed annular recesses providing a chamber for replenishing fluid for said cylinder space, packing surrounding said shaft and a retainer ring therefor on said closure wall, and a spring between said intermediate wall and said retainer ring for effecting compression of said packing material around the shaft by said retainer ring.

5. A hydraulic shock absorber comprising a circumferential wall and an end wall closing one end thereof, an intermediate wall within said circumferential wall, said walls defining a hydraulic cylinder space, abutment walls extending inwardly from said circumferential wall between said end and intermediate walls, a piston hub within said cylinder space having vanes cooperable with said abutment walls to displace hydraulic fluid in said cylinder space, flow passageways through said piston hub for the displaced fluid and valve mechanism for controlling such flow, a closure wall threading into the other end of said circumferential wall for engagement with said intermediate wall to effect axial clamping of said intermediate wall and said abutment walls in said circumferential wall, a shaft extending from said piston hub through and journalled in said intermediate wall and said closure wall, said intermediate wall being press fitted into said circumferential wall and having a long fit with said circumferential wall whereby to resist leakage from said cylinder space out between said intermediate wall and said circumferential wall, a sealing gasket interposed between the outer corner of said intermediate wall and said circumferential wall and compressed by said closure wall to further resist leakage from said cylinder space, said intermediate wall and said closure wall having opposed annular recesses defining a chamber for replenishing fluid for said cylinder space, and a connection for the flow of the replenishing fluid from said replenishing chamber to said cylinder space.

6. A hydraulic shock absorber comprising a circumferential wall and an end wall closing one end thereof, an intermediate wall within said circumferential wall, said walls defining a hydraulic cylinder space, abutment walls extending inwardly from said circumferential wall between said end and intermediate walls, a piston hub within said cylinder space having vanes cooperable with said abutment walls to displace hydraulic fluid in said cylinder space, flow passageways through said piston hub for the displaced fluid and valve mechanism for controlling such flow, a closure wall threading into the other end of said circumferential wall for engagement with said intermediate wall to effect axial clamping of said intermediate wall and said abutment walls in said circumferential wall, a shaft extending from said piston hub through and journalled in said intermediate wall and said closure wall, said intermediate wall being press fitted into said circumferential wall and having a long fit with said circumferential wall whereby to resist leakage from said cylinder space out between said intermediate wall and said circumferential wall, a sealing gasket interposed between the outer corner of said intermediate wall and said circumferential wall and compressed by said closure wall to further resist leakage from said cylinder space, said intermediate wall and said closure wall having opposed annular recesses defining a chamber for replenishing fluid for said cylinder space, and a connection for the flow of the replenishing fluid from said replenishing chamber to said cylinder space, there being a gap around said shaft between said intermediate wall and the closure wall for return to the replenishing chamber of any fluid leaking out from the cylinder space between the intermediate wall and the shaft.

7. A hydraulic shock absorber comprising a circumferential wall and an end wall closing one end thereof, an intermediate wall fitting into said circumferential wall, said walls defining a hydraulic cylinder space, abutments extending into said cylinder space from said circumferential wall and between said end and intermediate walls, a vaned piston structure within said cylinder space cooperable with said abutment walls to displace hydraulic fluid, a closure wall threading into the outer end of said circumferential wall into clamping engagement with said intermediate wall to secure said intermediate wall and said abutment walls axially, the circumferential surface of said intermediate wall being of comparatively long width whereby to resist leakage of fluid from said cylinder space out between said circumferential wall and said intermediate wall, and a sealing gasket between the outer corner of said intermediate wall and said closure wall for further sealing against escape of fluid.

8. A hydraulic shock absorber comprising a circumferential wall, an end wall enclosing one end of said circumferential wall, an intermediate wall within said circumferential wall, said walls defining a cylindrical space, partition walls extending into said cylinder space from said circumferential wall and between said end and intermediate walls, a vaned piston hub in said cylinder space for displacing hydraulic fluid therein, a closure wall for the other end of said circumferential wall having threaded engagement therein for clamping said end wall and said intermediate wall and said partition walls together axially, a shaft extending from the piston hub and journalled in said intermediate wall, said intermediate wall and said closure wall having opposed recesses providing a replenishing chamber, valve means controlling the flow of the displaced fluid, and valve means controlling the flow from said replenishing chamber into said cylinder space.

9. A hydraulic shock absorber comprising a circumferential wall, an end wall enclosing one end of said circumferential wall, an intermediate wall within said circumferential wall, said walls defining a cylinder space, partition walls extending radially into said cylinder space, a vaned piston hub in said cylinder space cooperating with said abutment to displace hydraulic fluid, means controlling the flow of the displaced fluid, a closure wall for the other end of said circumferential wall threading thereinto into engagement with said intermediate wall for axially clamping said intermediate wall and said partition walls, a shaft for the piston hub journalled in said intermediate wall and said closure wall, said closure wall and said intermediate wall having opposed annular recesses providing a replenishing chamber, and means controlling the fluid flow from the replenishing chamber to the cylinder space.

RALPH F. PEO.